US008042107B2

(12) United States Patent
Amodio et al.

(10) Patent No.: US 8,042,107 B2
(45) Date of Patent: Oct. 18, 2011

(54) SYSTEM AND METHOD FOR EXPEDITING AND AUTOMATING MAINFRAME COMPUTER SETUP

(75) Inventors: Thomas Amodio, Brookville, NY (US); Michael Wojtukiewicz, Brookville, NY (US); Robert Malitz, Brookville, NY (US)

(73) Assignee: Infinity Systems Software, Inc., Brookville, NY (US)

( * ) Notice: Subject to any disclaimer, the term of this patent is extended or adjusted under 35 U.S.C. 154(b) by 1542 days.

(21) Appl. No.: 11/183,386

(22) Filed: Jul. 18, 2005

(65) Prior Publication Data

US 2005/0268295 A1    Dec. 1, 2005

Related U.S. Application Data

(62) Division of application No. 10/263,972, filed on Oct. 2, 2002, now Pat. No. 7,194,737.

(51) Int. Cl.
*G06F 9/44* (2006.01)
*G06F 9/445* (2006.01)

(52) U.S. Cl. ........................ 717/175; 717/169

(58) Field of Classification Search .......... 717/170–175; 713/1–2
See application file for complete search history.

(56) References Cited

U.S. PATENT DOCUMENTS 5,367,686 A * 11/1994 Fisher et al. ................. 717/174
5,499,340 A * 3/1996 Barritz ............................ 714/47
2004/0006688 A1 * 1/2004 Pike et al. ........................ 713/1

OTHER PUBLICATIONS

ServerPac: Using the Installation Dialog International Business Machines Corporation 2nd Edition, Jun. 2001.*
Maintenance of System Software on a Wide Area Network of Mainframes Ofer Wolfgor Proceedings of the Fifth Israeli Conference on Computer Systems and Software Engineering, May 1991.*
Merant International Limited, "Installation and Usage Guide—Mainframe Access Product Suite for MVS," Version 2.0 GA, 1999.

* cited by examiner

*Primary Examiner* — Emerson Puente
*Assistant Examiner* — Paul Mills
(74) *Attorney, Agent, or Firm* — Ostrolenk Faber LLP

(57) ABSTRACT

The present invention preferably automates mainframe computer operating system upgrades by automatically installing a base operating system on the mainframe system, performing information-gathering of an existing mainframe computer system, using the information to recreate the environment settings of the existing system, and providing a series of directives typically required of a skilled mainframe computer systems programmer for an IPL. By preparing a mainframe computer system to automatically perform an IPL, and, thereafter, automating a series of configuration process to install optional products, the present invention decreases the amount of time and operator skill-level requirements for prior art mainframe computer operating system upgrades.

10 Claims, 10 Drawing Sheets

SYSTEM AND METHOD FOR EXPEDITING AND AUTOMATING MAINFRAME COMPUTER SETUP

CROSS-REFERENCE TO RELATED APPLICATION

This is a division under 37 C.F.R. §1.53(b) of prior U.S. patent application Ser. No. 10/263,972, filed Oct. 2, 2002 in the name of Thomas Amodio, Michael Wojtukiewicz and Robert Malitz entitled SYSTEM AND METHOD FOR EXPEDITING AND AUTOMATING MAINFRAME COMPUTER SETUP, the contents of which are incorporated herein by reference.

FIELD OF THE INVENTION

This invention is directed to installing an operating system on an information processor, and more particularly to using a personal computer to perform a remote and automated upgrade of a mainframe computer operating system.

BACKGROUND OF THE INVENTION

As large-scale, mainframe computer systems continue to evolve, many existing computing platforms are continuously supported, and on-line access to legacy data is available. For example, the International Business Machines ("IBM") System 390 running IBM the OS/390 operating system with WEBSPHERE MQ middleware applications supports dozens of computing platforms across extended enterprise systems. By operating a series of products, including, for example, MQ INTEGRATOR (supporting CICS integration with extended systems), MQ SERIES EVERYPLACE (supporting personal digital assistant, "PDA," applications), MQ EVENT BROKER (providing telemetry integration) and MQ WORKFLOW (providing support for AIX, HP-VX, Solaris, and WINDOWS NT/WINDOWS 2000), mainframe computer systems remain a viable and cost-effective data management tool for many organizations.

While access to data on mainframe computer systems has become significantly more flexible, the installation and maintenance of mainframe computer system operating systems remains an arduous task. Installing and configuring a mainframe computer system depends, in large part, on the operator's technical skill level. For example, in order to set up or upgrade a mainframe computer system, referred to herein, generally, as an initial program load ("IPL"), a skilled mainframe computer systems programmer is required. Unlike personal computers that automatically "boot-up" after receiving power (i.e., being turned on), a mainframe IPL is considerably complex and time-consuming. For example, one or more skilled technicians typically expend three to four days to upgrade a mainframe computer operating system and prepare the system for an IPL.

Referring to the drawing figures in which like reference designators refer to like elements, there is shown in FIG. 1 a prior art arrangement for upgrading an operating system of a mainframe computer. As shown in FIG. 1, a mainframe computer system 2 communicates with a client system 4. Client computer system 4 can be any device capable of emulating a terminal of mainframe computer system 2. For example, client computer system 4 can be a personal computer running 3270 terminal emulation software. Alternatively, client computer system 4 can be a "dumb" terminal that operates solely as a terminal of mainframe computer system 2. In the prior art, a user of client computer system 4 is a skilled mainframe computer systems programmer who is capable of performing complex upgrades to the mainframe computer operating system and environment.

As smaller-scaled computer systems, for example, personal computers, desktops server computers, and mid-ranged computer systems (e.g., IBM AS-400) become more prevalent in the marketplace, system programmers who are capable of installing, configuring, and maintaining mainframe computer systems are in great demand.

Moreover, the average age of mainframe computer system programmers and/or managers continues to rise as younger systems programmers remain attracted to small-scale computing platforms, such as personal computers and mini computers. The average age of skilled mainframe system programmers, capable of installing, configuring and maintaining mainframe computer systems rises with each passing year. As mainframe computer system programmers continue to age, they find it increasingly difficult to efficiently install new technologies, for example, the family of WEBSPHERE MQ products, and mainframe storage and security based systems (e.g., TIVIOLI). The integration of old with new technology presents problems for an aging group of mainframe computer systems programmers who typically prefer to work with familiar technologies. The ability to complete mainframe operating system upgrades, combined with complex optional product installations on schedule and on budget becomes increasingly problematic over time.

SUMMARY OF THE INVENTION

The present invention is directed to solving the above-identified problems associated with mainframe computer system set-up and maintenance, specifically for operating systems.

The present invention provides a system for upgrading an operating system on a mainframe computer system, including generating a base operating system that comprises a series of mainframe computer operating system components, and transferring the base operating system to a mainframe computer system.

Moreover, the present invention performs "discovery" on the mainframe computer system in order to receive profile information of the configuration of the mainframe computer system. The profile information is directed to hardware and software components existing on the mainframe computer system prior to an operating system upgrade, and is used by the present invention to ensure a similar environment exists after the upgrade to the mainframe computer operating system is performed.

After the base operating system is installed on the mainframe computer system 2, and the environment of the mainframe computer system is configured to represent the mainframe computer system prior to the upgrade process, the mainframe computer system has an IPL performed thereon. After the mainframe computer system is IPL'd, then the mainframe computer system is customized to provide for, for example, external hardware devices (e.g., network adapters, tape drives and back up systems), remote communications (e.g., DNS and TCP/IP settings), and to configure partitioned data sets and corresponding members.

BRIEF DESCRIPTION OF THE DRAWINGS

For the purposes of illustrating the invention, there is shown in the drawings a form which is personally preferred, it being understood, however, that the invention is not limited to the precise arrangements and instrumentalities shown. The features and advantages of the present invention will become apparent from the following description of the invention which refers to the accompanying drawings, in which.

DETAILED DESCRIPTION OF PREFERRED EMBODIMENTS OF THE INVENTION

The present invention simplifies the requirement for user intervention, and dramatically shortens the time typically required to upgrade, configure and maintain an operating system for a mainframe computer system 2. The present invention employs a plurality of computer hardware and software systems that preferably automatically gather information from an existing mainframe computer system, and use the information for upgrading and maintaining the same or another system.

As used herein, the term, "upgrade" refers, generally, to installing a mainframe computer operating system, and using, in part, environment settings and other configuration settings from an existing system therefor. The mainframe computer system receiving the upgrade may or may not be the same computer system that provides the environment and configuration settings used for the upgrade.

The present invention is concerned with mainframe computer systems. More particularly, the present invention is directed to providing an automated system and method for automating and simplifying the many complex steps associated with upgrading an operating system on a mainframe computer system. Secondarily, and separate from the present invention's primary concern with upgrading an operating system on a mainframe computer system, the present invention can be used to install extremely complex mainframe software applications, for example, WEBSPHERE MQ products. As used herein, references to WEBSPHERE MQ products, TIVOLI, DB2 and other mainframe software applications and/or products are directed to the secondary concern of the present invention, over the primary concern of upgrading an operating system on a mainframe computer system. Such references are not intended to represent a primary purpose or primary concern of the present invention in any way.

The present invention preferably automates the mainframe computer operating system upgrade process by automatically employing a series of directives typically required of a skilled mainframe computer systems programmer. By preparing a mainframe computer system 2 to automatically perform an IPL, and, thereafter, automating a series of processes to configure the operating system, and further to install optional products, the present invention decreases the amount of time required, and also lowers the required operator skill-level for prior art mainframe computer system operating system upgrades.

Figure 1:
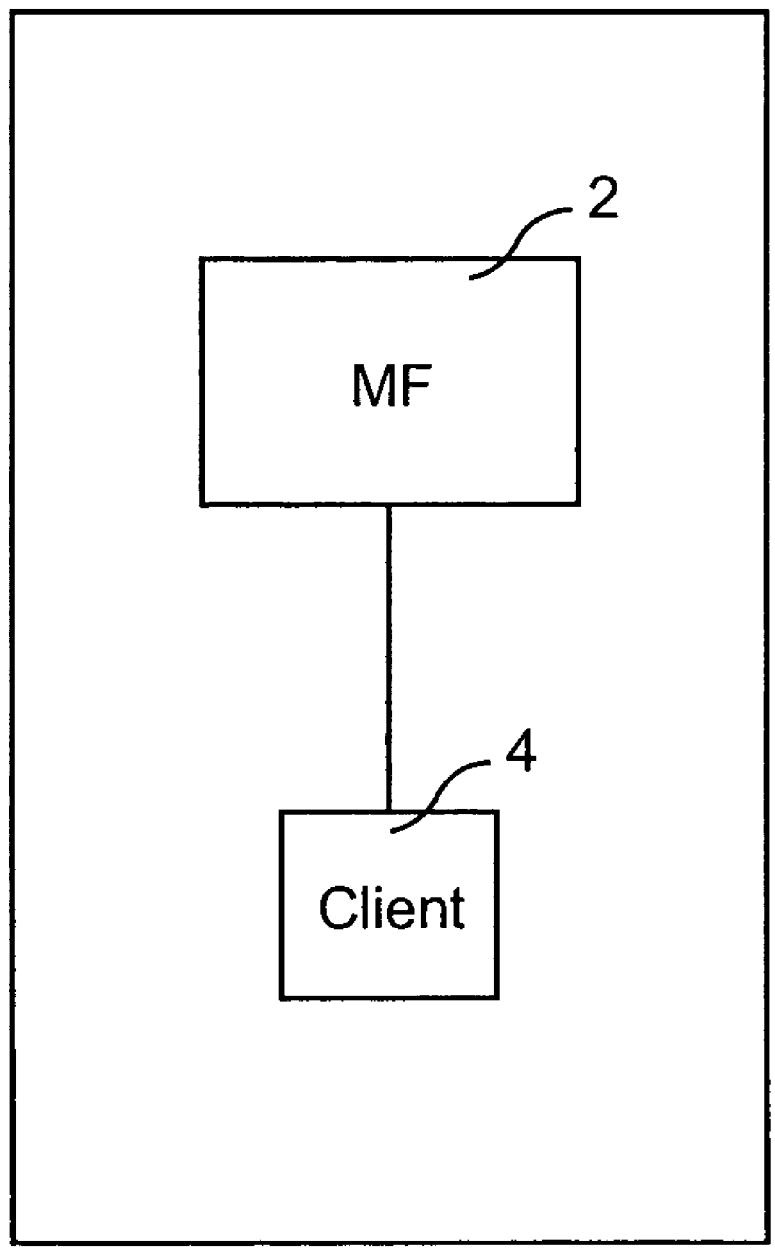
FIG. 1 is a block diagram illustrating devices used for a prior art mainframe computer operating system upgrade.
Figure 2:
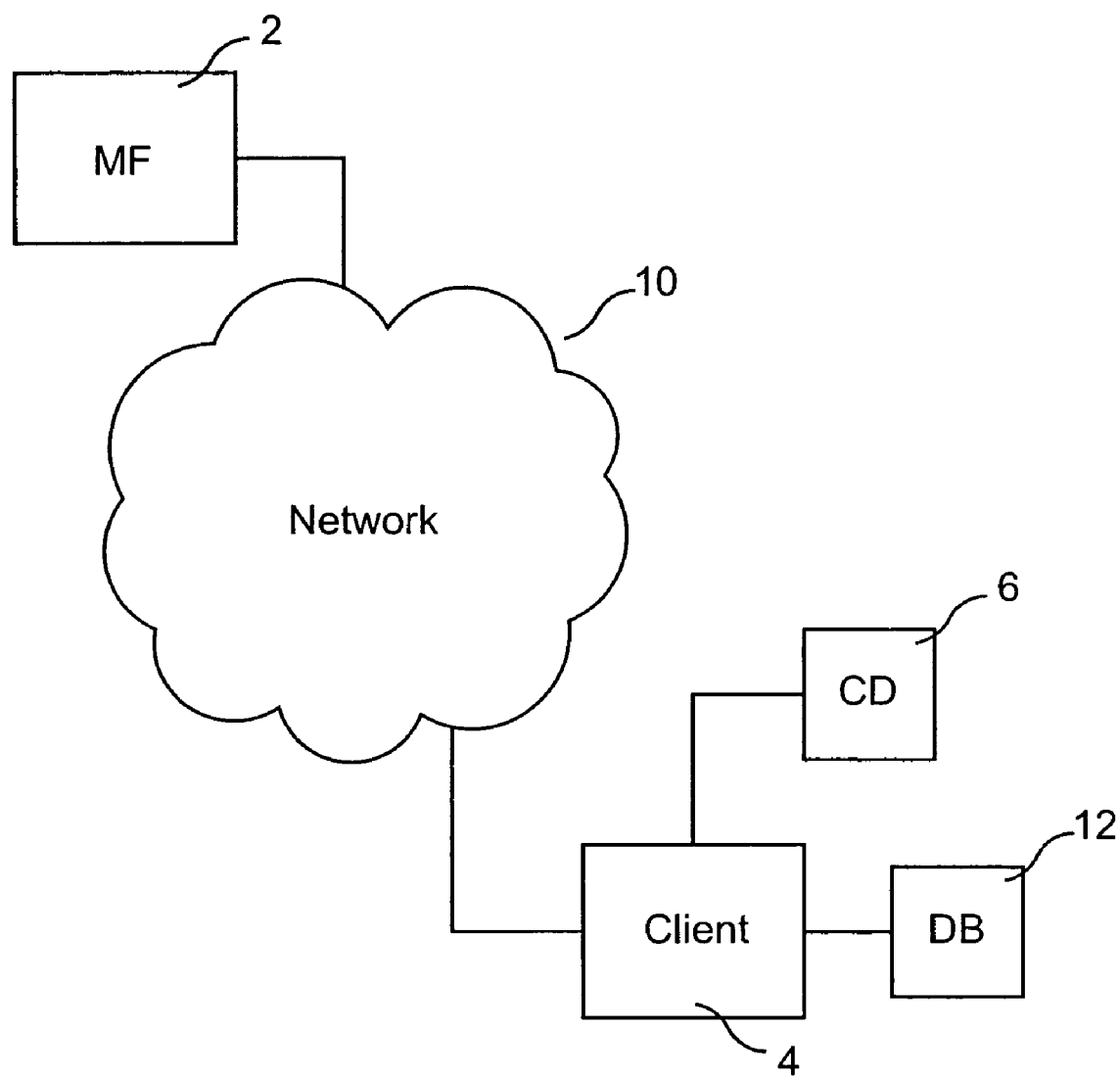
FIG. 2 is a block diagram illustrating the devices associated with a mainframe computer operating system upgrade in accordance with the present invention.

FIG. 2 shows an example arrangement for upgrading mainframe computer operating systems in accordance with the present invention, and designated generally as mainframe upgrade system 10. As shown in FIG. 2, a mainframe computer system 2 interfaces with a client computer system 4 via a CD-ROM drive 6 and communication network. The client computer system 4 includes storage for data, for example, a database 12, and uses the data stored therein to provide information directed to the mainframe computer system 2 for the operating system upgrade, installation and maintenance.

Mainframe computer system 2 and client computer system 4 are typical devices suitable for performing the functions required of host and client systems, respectively. For example, each client computer system 4 is a personal computer device capable of accessing a global computer network, such as the Internet. Mainframe computer system 2 is a mainframe computer system, for example, an IBM System 90. Also, each mainframe computer system 2 and client computer system 4 can be logically and physically located anywhere in the world. The control programs running on mainframe computer system 2 and on client computer system 4 can be written in any language suitable for programming, such as Assembler, C, C++, VisualBasic and Java.

In order to reduce the amount of time required to install, configure and maintain a mainframe computer system 2 with an operating system, for example, OS/390 from IBM, a user of client computer system 4 operates special software control programs that gather information directed to specific components desired by the user to be installed on the mainframe computer system 2. The information is used by the present invention during the automated upgrade processes described herein. After the information gathering processes are complete, a series of processes are invoked in order to perform the mainframe computer operating system upgrade.

In a preferred embodiment, the present invention provides an interface for a client computer system 4 and an existing mainframe computer system 2. The present invention preferably queries the existing mainframe computer system 2 for a plurality of parameters that are directed to the way the mainframe computer system 2 is configured. For example, the number of volumes and partitions installed on the mainframe computer system 2 is preferably retrieved and stored in a database for use during the upgrade. The information gathering component of the present invention uses the information to mimic the existing mainframe computer system 2 environment, and, further, to configure the mainframe computer system 2 that is receiving the upgrade for optimal performance.

After information directed to the mainframe computer system 2 is retrieved, a series of system files are preferably created. The system files are formatted as one or more sequential files, and, further, are compressed into one or more smaller-sized files. The compressed file(s) are stored on a removable media, for example, a CD-ROM, for future use during the upgrade process. After receiving and decompressing the system files stored on the CD-ROM, the client computer system 4 interprets the files and invokes processes which use the information therein to upgrade the operating system for the mainframe computer system 2.

In a preferred embodiment of the present invention, a base operating system 2 is provided for the mainframe computer system 2 that comprises many components required of an upgraded mainframe computer operating system. The base operating system requires many installation steps, however, preferably provided automatically by the present invention, to combine and customize the components comprising the base operating system in order for a successful IPL to be performed. Absent the steps and processes described herein, a skilled mainframe computer systems programmer is required to enable a mainframe computer system 2, using just the base operating system, to successfully IPL the mainframe computer system 2. The skilled systems programmer is required to combine processes included in the base operating system and, moreover, to provide complex details directed to the mainframe computer system 2 to perform an IPL.

In a preferred embodiment of the present invention, a series of application processes, for example, batch files, are sequentially executed on the mainframe computer system 2 that operate on the base operating system. After each batch file is executed, the present invention evaluates output condition codes of each job to verify its successful execution. In the event that an error is detected by the client computer system 4, then, in accordance with checkpoints established via the present invention, the specific batch job is repeated in order to continue with the upgrade process. Alternatively, and preferably in response to a user-supplied directive, the upgrade process is halted.

After the batch files have been successfully executed, then the first initial program load ("IPL") of the system is performed, and the present invention prompts the user of the client computer system 4 for a series of additional criteria directed to components to be installed on the mainframe computer system 2. After the information is received by the present invention, then additional installation measures, described in detail below, are performed and a second IPL is preferably done in order to complete the upgrade. Thereafter, the user is able to access the mainframe computer system 4 and enjoy the many benefits of the operating system upgrade.

In addition to upgrading the operating system on the mainframe computer system 2, the present invention secondarily provides a system and method for adding specific products to the mainframe computer system 2, for example, WEBSPHERE MQ products, easily and quickly.

Also in accordance with the present invention, a server system, for example, a hypertext transfer protocol ("HTTP") server running on the mainframe computer system 2, enables remote access to and use of the information stored in the database 12. After a client computer system 4 establishes a communication session, for example a HTTP session, with the HTTP server, the system files directed to the mainframe computer system 4 are preferably transmitted to the client computer system 4. In a preferred embodiment, the client computer system 4 connects remotely to the server system via a HTTP session, and performs functions directed to the upgrade over the HTTP session.

Details regarding the steps associated with performing an upgrade in accordance with the present invention are now described with reference to the flowcharts in FIGS. 3-5C.

Figure 3:
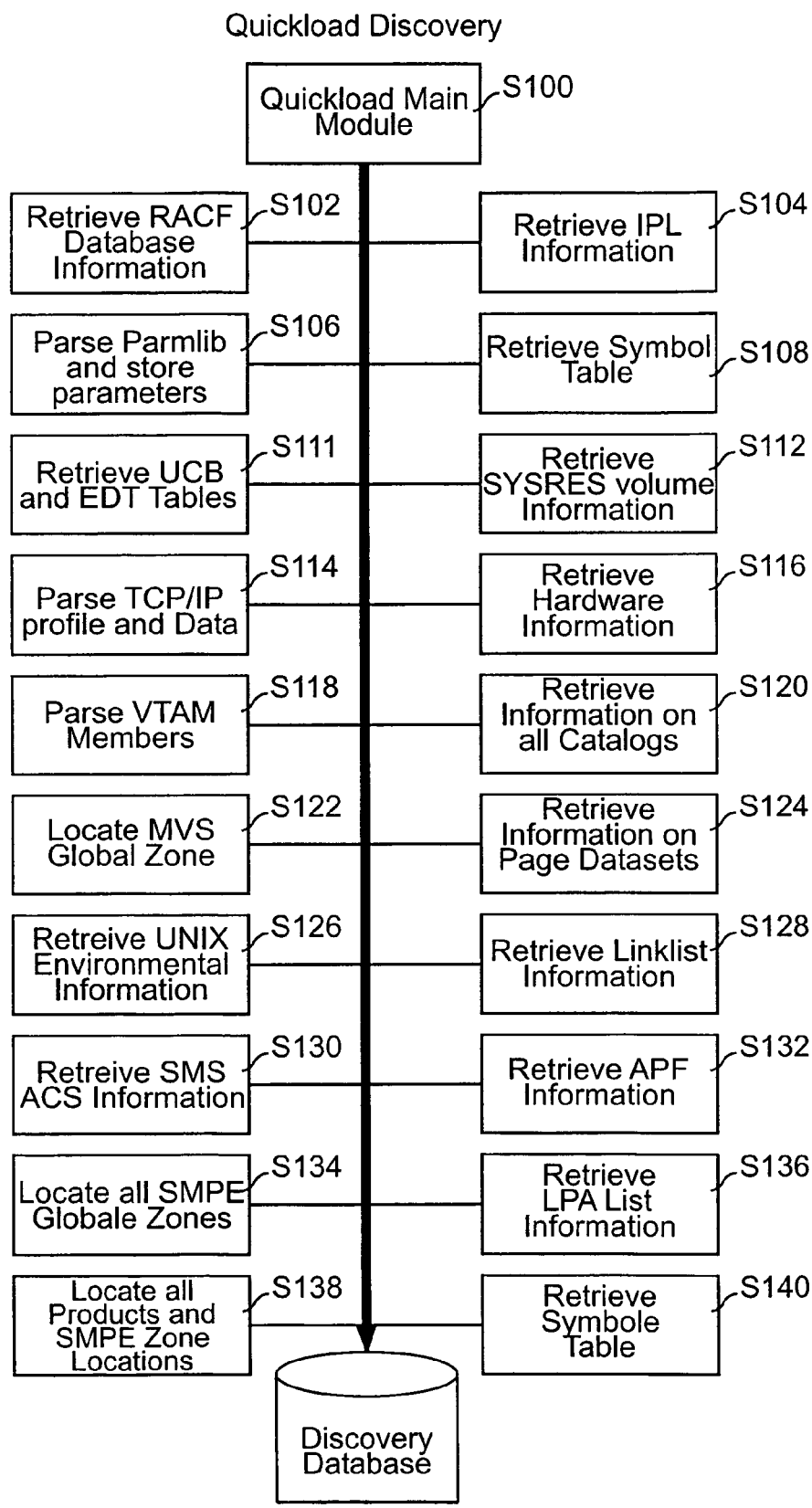
FIG. 3 is a flowchart illustrating the steps associated with so-called "discovery" processes in accordance with the present invention.

Referring to the flowchart shown in FIG. 3, in step S100, the mainframe upgrade system 10 is preferably invoked to discover information directed to a current configuration of the mainframe computer system 2. In step S102, information stored in a RACF database is retrieved for review. In step S104, information directed to the system's IPL is preferably retrieved. In step S106, a plurality of parameters stored in the mainframe computer system 2 PARMLIB are parsed and stored for future use. In step S108, the mainframe computer system's 2 Symbol table is retrieved. In step S110, UCB and EDT tables are retrieved. In step S112, the mainframe computer system 2 SYSRES volume information is retrieved. In step S114, the TCP/IP profile and protocol data of the mainframe computer system 2 are parsed and stored for future use. In step S116, hardware information directed to the mainframe computer system 2 is retrieved. In step S118, VTAM members are parsed and stored for future use. In step S120, information directed to all catalogs installed on the mainframe computer system 2 is retrieved. In step S122, the MVS Global Zone on the mainframe computer system 2 is located.

Continuing with the flow chart in FIG. 3, in step S124, information directed to Page Data Sets on the mainframe computer system 2 is retrieved and stored for future use. In step S126, UNIX environment information is retrieved. In step S128, Linklist information is retrieved. In step S130, SMS ACS information is retrieved from the mainframe computer system 2 and stored for future use. In step S132, APF information is retrieved. In step S134, all SMP global zones are located. In step S136, LPA list information is retrieved from the mainframe computer system 2. In step S138, system preferably locates all products in SMP-E zone locations. Finally, in step S140, the Symbol table is again retrieved. In accordance with the steps described (step S100 through step S140), the data directed to the above-identified particulars are stored in a discovery database and used to quickly and efficiently configure the environment for the mainframe computer system 2 receiving the upgraded operating system.

FIGS. 4(*a*)-4(*d*) illustrate the steps associated with an upgrade of an operating system mainframe computer system 2 with an operating system, for example, OS/390 or z/OS in accordance with the present invention. The information stored in the discover database, including the data retrieved during steps S100-S140 (FIG. 3), is referenced and used during the installation process described in FIGS. 4(*a*)-4(*d*).

In step S200, a user operating the client computer system 4 executes an application to implement the steps associated with the operating system upgrade. The application is preferably scaled to run on a desktop PC, and includes instructions to carry out operating system installation processes on mainframe computer system 2.

In step S202, a connection is established between the client computer system 4 and the mainframe computer system 2, for example, by selecting an object, such as a windows icon which invokes software control programs to create the connection. In step S204, the mainframe upgrade system 10 receives information from the user of client computer system 4, for example, user ID, password and IP address defined for a File Transfer Protocol ("FTP") server installed on the mainframe computer system 2, and requests a FTP communication session with the FTP server, for example, by providing the IP address of the FTP server, and the user ID and password information.

In step S206, a determination is made whether a FTP server on a mainframe computer system 2 responds to the session request from the client computer system 4. In the event the mainframe computer system 2 does not have an FTP server installed thereon, or the client computer system 4 cannot establish a connection with the FTP server located on the mainframe computer system 2, then the process ends in step S208. In the event that, in step S206, the FTP server on mainframe computer system 2 successfully responds to the client computer system 4 request for a communication session, then, in step S210, mainframe upgrade system 10 preferably generates and maintains information required to authenticate a user on mainframe computer system 2.

In a preferred embodiment of the present invention, the mainframe upgrade system 10 interacts with other installation and operating system maintenance applications that are inherent to the particular operating system being installed. For example, the mainframe upgrade system 10 preferably interacts with SMP-E, an IBM tool for installing and maintaining software in OS/390 or z/OS mainframe computer systems. In step S210, the mainframe upgrade system 10 preferably generates a job card that provides information for SMP-E to implement the setup and installation of the operating on mainframe computer system 2. After the job card is generated, or, if necessary, modified, then the client computer system 4 transmits the generated job card to the mainframe computer system 2.

Figure 4A:
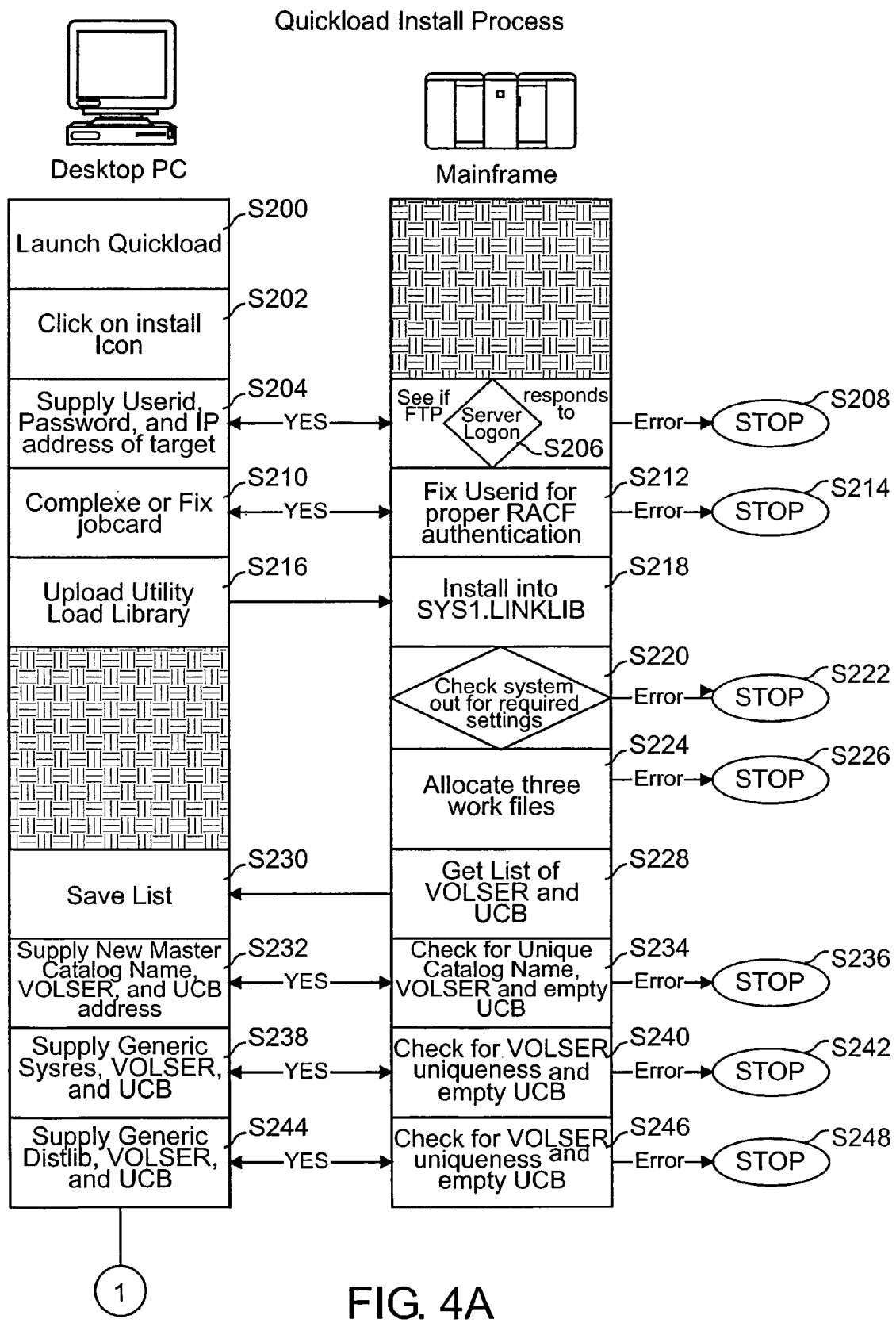
FIG. 4A is a flowchart illustrating the steps associated with installing a base operating system on a mainframe computer system in accordance with the present invention.

Continuing with the flow chart in FIG. 4A, in step S212, the present invention prepares the user for proper authorization in order to install and maintain the operating system on mainframe computer system 2. In a preferred embodiment, the mainframe upgrade system 10 fixes a user ID for proper SECURITY authentication. In the event that an error occurs during the authentication process, then, in step S214, the process terminates.

After the mainframe computer system 2 has provided proper authentication and authorization for the user operating the client computer system 4, then, in step S216, the mainframe upgrade system 10 preferably uploads a utility load library into the mainframe computer system 2. The mainframe computer system 2, in step S218, receives the utility load library and installs it into a predefined location on mainframe computer system 2, for example, SYS1.LINKLIB. After the mainframe computer system 2 installs the utility load library in step S218, then an evaluation is made whether the mainframe computer system 2 possesses the required settings to continue with the installation process (step S220). In the event the required settings for continuing the installation do not exist, then in step S222, the process terminates. In a preferred embodiment of the present invention, a screen display is automatically presented to the user that identifies setting(s) that require correction or adjustment. In the event that, in step S220, the present invention determines that required settings to continue with installation are present, then three work files are preferably allocated (step S224). Preferably, the three work files are needed to be used for the compressed files, the uncompressed files and the restore files. In the event that an error occurs when allocating the work files in step S224, then, in step S226, the process terminates.

After the three work files are allocated in step S224, and no errors are encountered during the step of allocation, then a list is preferably generated on the mainframe computer system 2 for the volume serial number ("VOLSER") and also for the upper control blocks ("UCB"). The list of the VOLSER and the UCB's is transmitted, in step S228, to the client computer system 4 and the mainframe upgrade system 10 preferably saves the list in a memory (step S230).

In step S232, the mainframe upgrade system 10 preferably supplies a new master catalog name, VOLSER and UCB address to the mainframe computer system 2. The mainframe computer system 2 preferably checks for a unique catalog name for the VOLSER and empties the UCB (step S234). In the event that an error occurs during either reception of the new master catalog name, VOLSER, or during the emptying of the UCB addresses, then the process terminates in step S236.

In step S238, the mainframe upgrade system 10, operating on client computer system 4, supplies generic information directed to a system residence file/disk (SYSRES), VOLSER and UCB to mainframe computer system 2 (step S238). In step S240, the mainframe computer system 2 checks for the VOLSER uniqueness and corresponding empty UCB's. In the event an error is encountered during the check for VOLSER uniqueness and a corresponding empty UCB, then in step S242, the process terminates. In step S244, the mainframe computer system 2 receives the generic DISTLIB, VOLSER and UCB and again checks for VOLSER uniqueness and corresponding empty UCB's. In the event an error is encountered during the check for the VOLSER uniqueness and corresponding empty UCB, then the process terminates in step S246. If there are no errors encountered, then, in step S248, the mainframe upgrade system 10 preferably supplies generic distribution libraries (DISTLIB), VOLSER and UCB's to the mainframe computer system 2.

Figure 4B:
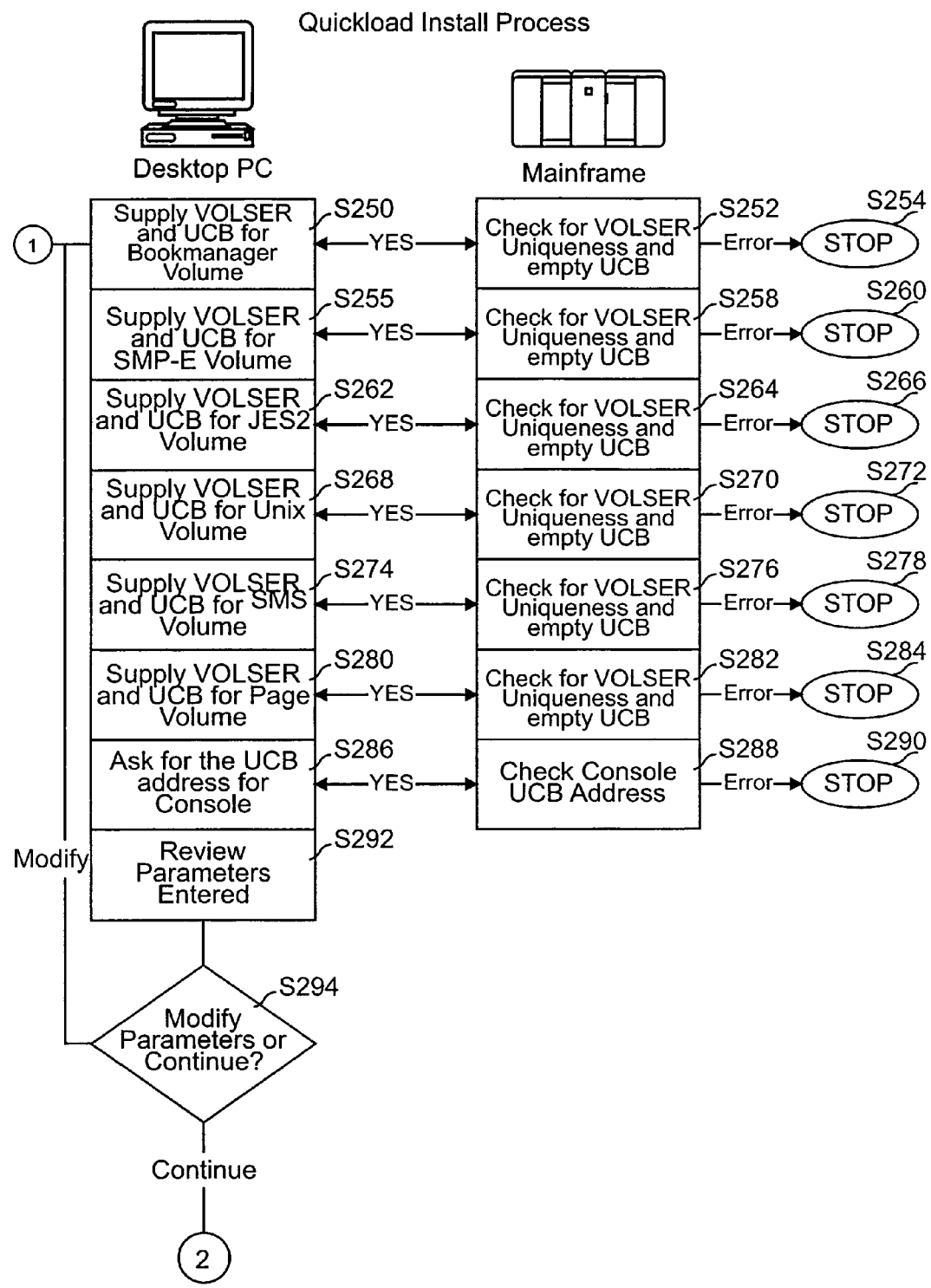
FIG. 4B is a flowchart illustrating the continued steps associated with installing a base operating system on a mainframe computer system in accordance with the present invention.

FIG. 4(b) illustrates the continued steps involved in the process of installing operating system on mainframe computer system 2.

In step S250, the mainframe upgrade system 10 supplies VOLSER and UCB's for the Bookmanager Volume. In step S252, the mainframe computer system 2 receives the Bookmanager volume information, and checks for corresponding empty UCB's (step S252). In the event an error is encountered during the check for the VOLSER uniqueness and/or corresponding empty UCB's for the Bookmanager volume, then the process terminates in step S254.

In step S256, the mainframe upgrade system 10 supplies a VOLSER and UCB's for the SMP-E volume. After the SMP-E volume information is received by the mainframe computer system 2, then the mainframe upgrade system 10 checks for VOLSER uniqueness and corresponding empty UCB's therefor (step S258). If an error is encountered during the check for the VOLSER uniqueness and/or the corresponding empty UCB's for the SMP-E volume, then the process terminates (step S260).

In step S262, the mainframe upgrade system 10 provides VOLSER and UCB's information for the JES2 volume. After the mainframe computer system 2 receives the JES2 volume information, in step S264, the mainframe upgrade system 10 checks for VOLSER uniqueness and corresponding empty UCB's. In the event an error is encountered during the check of the JES2 volume VOLSER uniqueness and corresponding empty UCB's, in step S266, the process terminates. In step S268, the mainframe upgrade system 10 supplies VOLSER and UCB information for the UNIX volume to the mainframe computer system 2. In step S270, the mainframe computer system 2, after receiving the UNIX volume VOLSER and UCB information, checks for VOLSER uniqueness and corresponding empty UCB's. In the event that an error is encountered during the checking for the UNIX volume VOLSER and corresponding empty UCB, then, in step S272, the process terminates.

In step S274, the mainframe upgrade system 10 preferably supplies the SMS volume VOLSER and UCB information to the mainframe computer system 2. After receiving the SMS volume information, in step S276, the mainframe computer system 2 preferably checks for VOLSER uniqueness and corresponding empty UCB's. In the event an error is encountered during the checking for the SMS volume VOLSER uniqueness and UCB, then the process terminates (step S278). In step S280, the mainframe upgrade system 10 preferably supplies VOLSER and UCB's for page volume. In step S282, the mainframe computer system 2 receives the page volume information and the mainframe upgrade system 10 checks for VOLSER uniqueness and corresponding empty UCB's. In the event that an error is encountered while checking for the VOLSER uniqueness and corresponding empty UCB's for the page volume, then the process terminates in step S284.

In step S286, the mainframe upgrade system 10 preferably prompts the user of client computer system 4 for the UCB's for the console. After the user submits the UCB's for the console, the console information is transmitted to the mainframe computer system 2 and the mainframe computer system 2 preferably checks the console UCB's (step S288). In the event that an error is encountered during the check of the console UCB, then, in step S290, the process terminates.

Figure 4C:
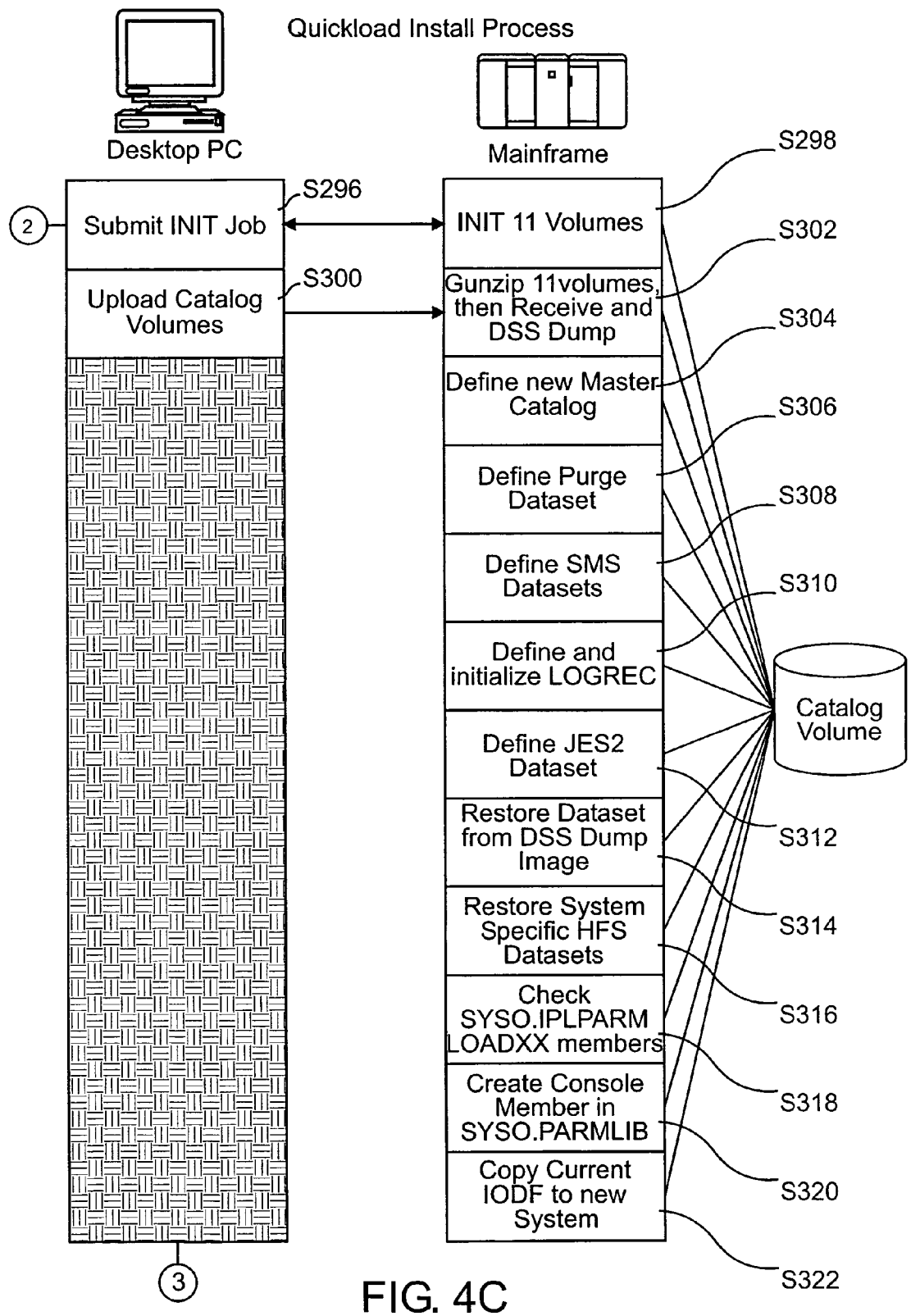
FIG. 4C is a flowchart illustrating the continued steps associated with installing a base operating system on a mainframe computer system in accordance with the present invention.

Thus, in steps S232 through S286, the mainframe upgrade system 10 preferably provides volume serial numbers and UCB's for a plurality of volumes. In step S292, the mainframe upgrade system 10 preferably reviews all of the parameters that have been entered and provided to this point. In step S294, mainframe upgrade system 10 preferably makes a determination whether any of the parameters transmitted to this point need to be modified. In the event that one or more parameters does need to be modified, then the process loops back to step S244 and continues from there. In the event that no parameters require modification, then the process continues to step S296 (FIG. 4C).

In step S296 (FIG. 4C), the mainframe upgrade system 10 preferably submits an INIT job to the mainframe computer system 2. The mainframe computer system 2 receives the INIT job, and, in step S298, initializes the eleven volumes (SYS1.LIKLIB, Master Catalog, Generic Sysres, Generic Distlib, Bookmanager, SMP-E, JES2, Unix, SMS, Page Volume and Console) defined up to this point.

In step S300, the mainframe upgrade system 10 preferably uploads updated catalog volumes to the mainframe computer system 2. The mainframe computer system 2, in step S302, receives the updated catalog volumes, and, thereafter, unzips the volumes and receives a decision support system (DSS) dump to the mainframe computer system 2 prepared by the mainframe upgrade system 10. Thereafter, the mainframe computer system 2 operates, for a period of time, independently of the client computer system 4 in order to prepare the catalog volumes for use. For example, a new master catalog is defined (step S304), a purge data set is defined (step S306), SMS data sets are defined (step S308), a LOGREC is defined (step S310). Moreover, in step S212, a JES2 data set is defined. In steps S314 and S316, the mainframe computer system 2 preferably restores data sets. For example, in step S314, the mainframe computer system 2 restores the data set from a DSS dump image. Moreover, in step S316, the mainframe computer system 2 preferably restores systems specific hierarchical file system ("HFS") data sets. Following the restoration of the data sets, the mainframe computer system 2, in step S318, checks SYS0.IPLPARM LOADXX numbers. In step S320, the console member is created in SYS0.PARMLIB. And in step S322, the mainframe computer system 2 preferably copies the current IODF to a new system.

Figure 4D:
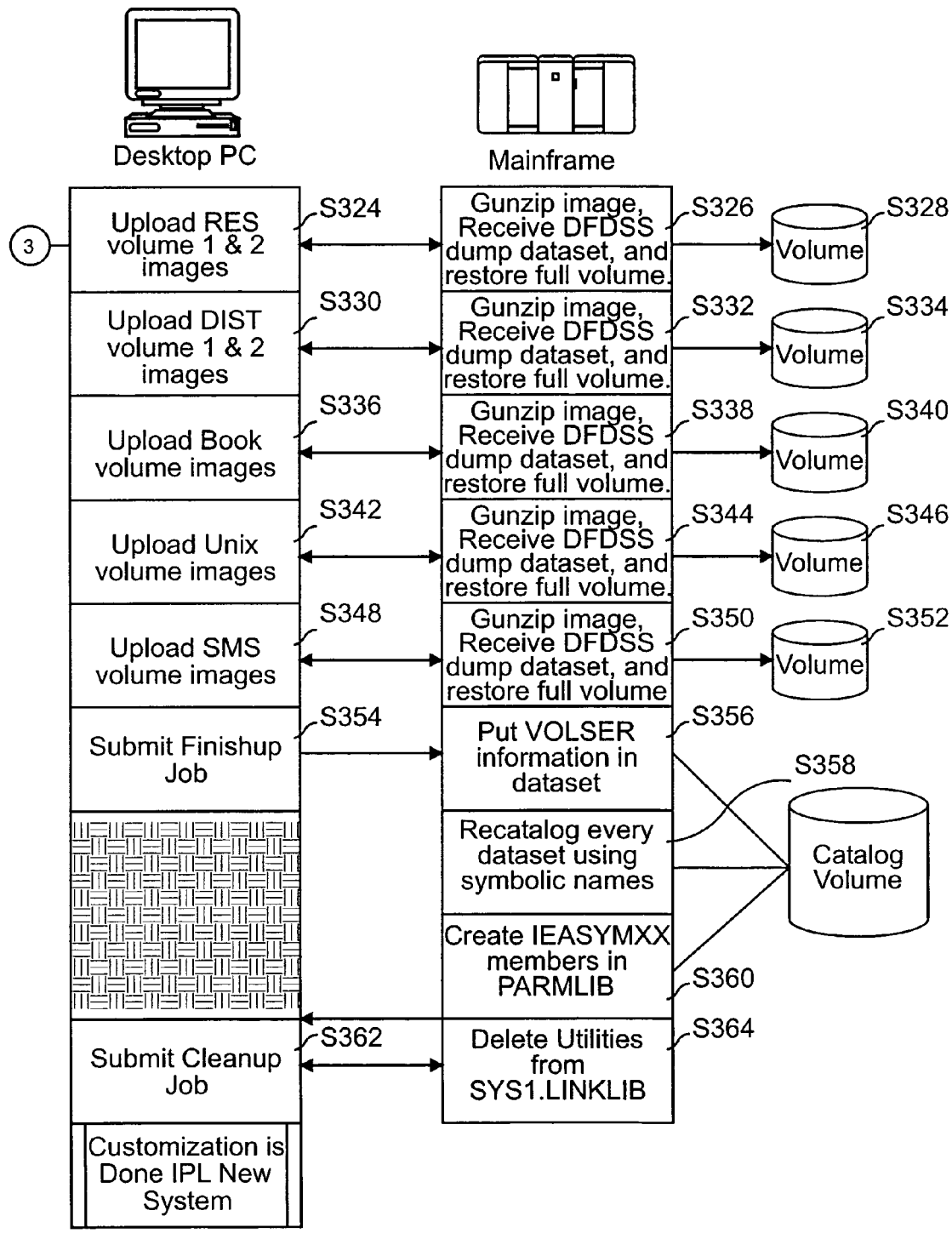
FIG. 4D is a flowchart illustrating the final steps associated with installing a base operating system on a mainframe computer system in accordance with the present invention.

FIG. 4(d) shows the remaining steps involved in upgrading the operating system on the mainframe computer system 2 and prepares for the mainframe computer system 2 automatic IPL.

In step S324, the mainframe upgrade system 10 invokes the client computer system 4 to upload the RES volume 1 and 2 images to the mainframe computer system 2. In step S326, the mainframe computer system 2 preferably receives the updated RES volumes images and decompresses the images to receive DFDFS dump data sets and restore the full volume therefrom. In step S328, the RES volume is created on the mainframe computer system 2. In step S330, the mainframe upgrade system 10 preferably uploads the DIST volumes 1 and 2 images from the client system 4 to the mainframe computer system 2. In step S332, the DIST volumes images are decompressed, the DFDFS dump data set is received and, in step S334, the DIST volume is created on the mainframe computer system 2.

In step S336, the mainframe upgrade system 10 preferably uploads the book volume images to the mainframe computer system 2. In step S338, the mainframe computer system 4 decompresses the book volume images, receives DFDFS dump data set and, in step S340, restores the full volume.

In step S342, the Unix volume images are preferably uploaded from the mainframe upgrade system 10 to the mainframe computer system 2. In step S344, the mainframe computer system 2 preferably decompresses the Unix volume images, receives the DFDFS dump data set, and restores the full volume. In step S346, the Unix volume is created. In step S348, the mainframe upgrade system 10 preferably uploads SMP volume images to the mainframe computer system 2. In step S350, the mainframe computer system 2 preferably decompresses the SMP image, receives DFDFS dump data set and restores the full volume. In step S352, the SMP volume is created.

In step S354, the mainframe upgrade system 10 submits a job for the mainframe computer system 2 to complete the upgrade of the operating system. After the job is received by the mainframe computer system 2, then, in step S356, the VOLSER information is put in a data set, and, in step S358, the mainframe computer system 2 preferably re-catalogs every data set using symbolic names. In step S360, the mainframe computer system 2 preferably creates IEASYMXX members in PARMLIB. The VOLSER information, the re-cataloged data sets and the IEASYMXX numbers in PARMLIB are all placed in the catalog volume. Upon completion of step S360, then, in step S362, the mainframe upgrade system 10 preferably submits a job that preferably deletes utilities on the mainframe computer system 2 as a clean up process. In step S364, the submitted job deletes utilities from SYS1.LINKLIB on the mainframe computer system 2.

Thus, through the preferred steps described above, the processes associated with upgrading an operating system, such as an OS/390 or a z/OS, on a mainframe computer system 2 is complete and the new system is ready for an IPL.

Figure 5A:
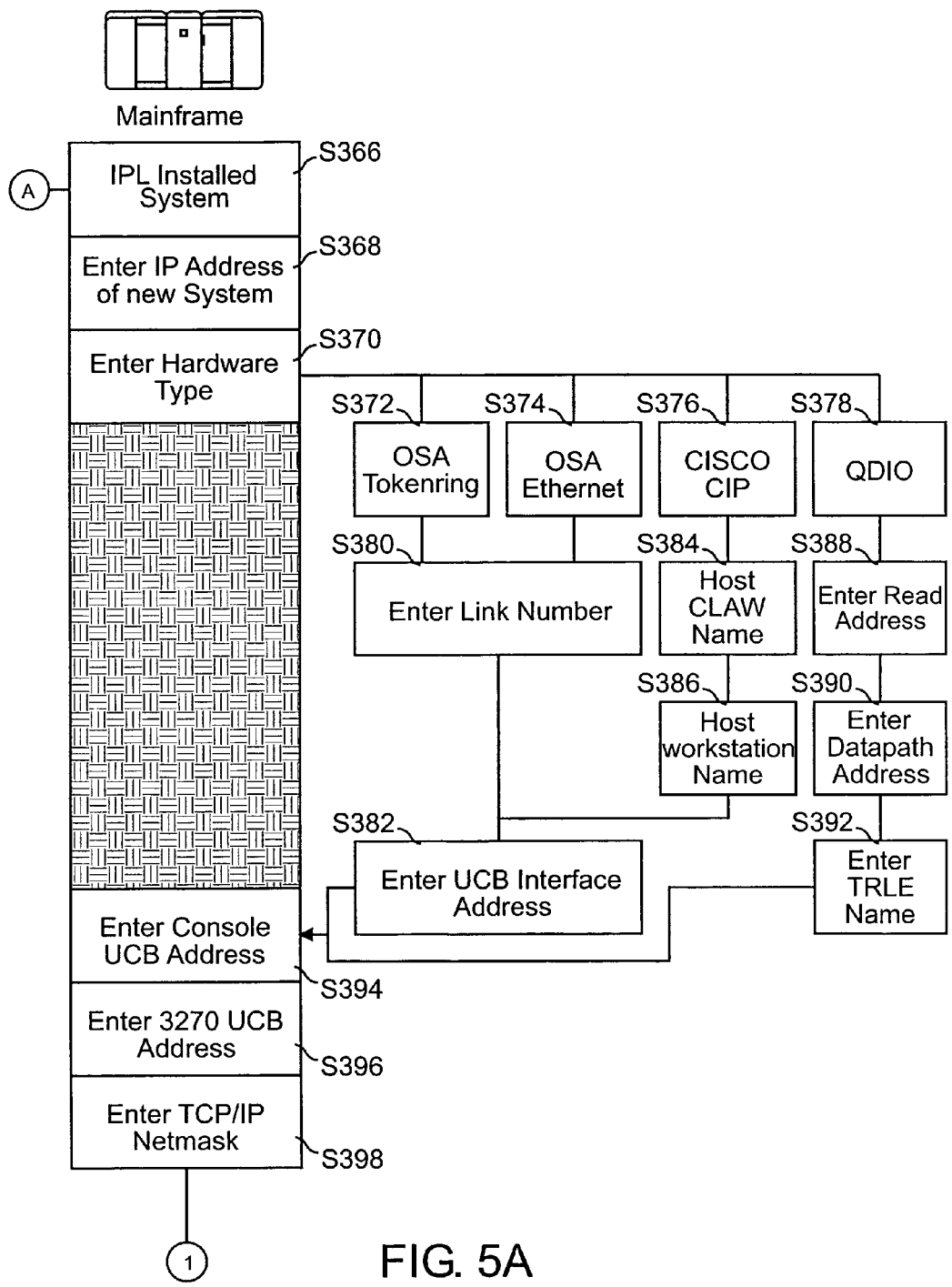
FIG. 5A is a flowchart illustrating the steps associated with customizing an upgraded operating system for a mainframe computer system in accordance with the present invention.
Figure 5B:
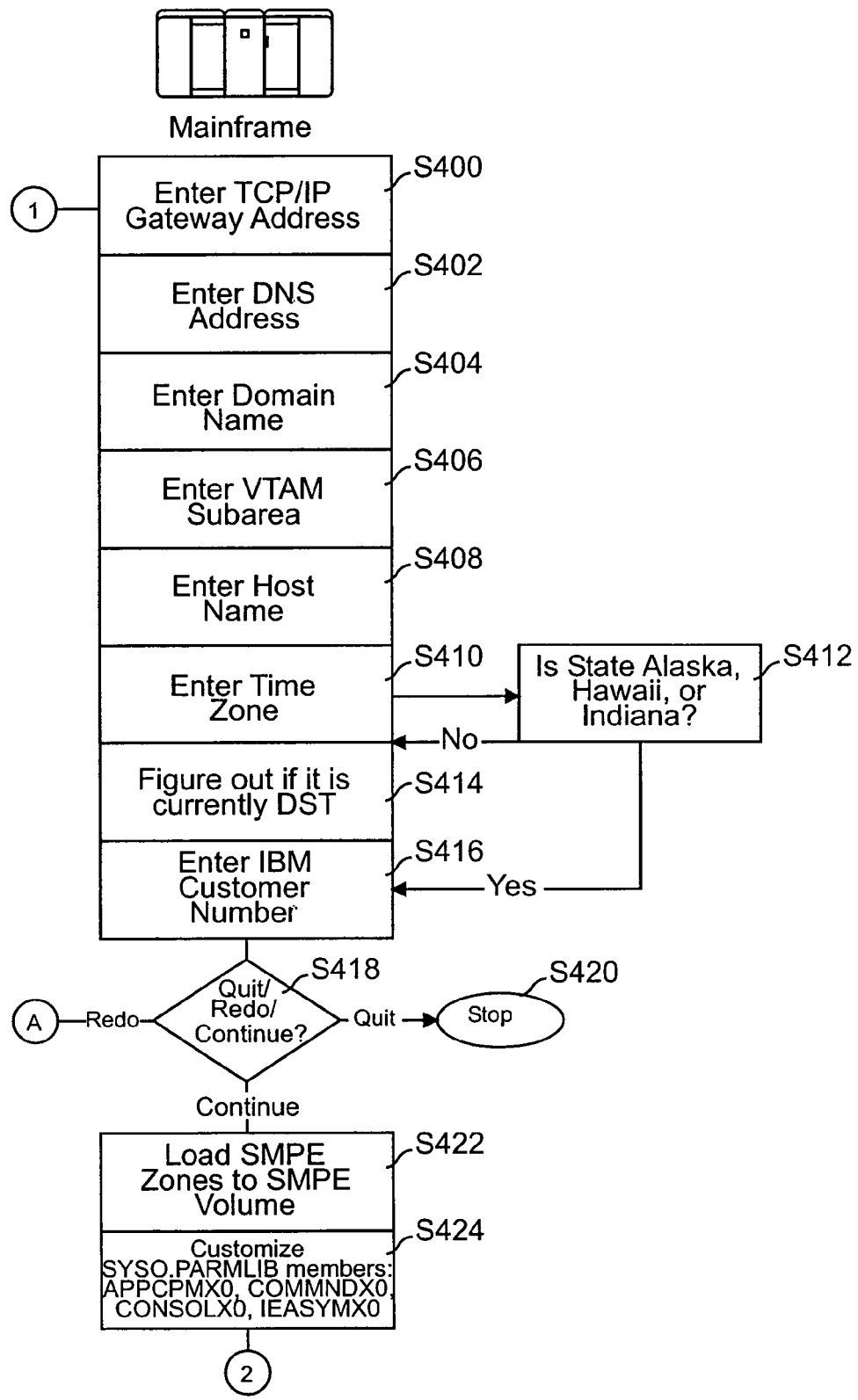
FIG. 5B is a flowchart illustrating the continued steps associated with customizing an upgraded operating system for a mainframe computer system in accordance with the present invention.
Figure 5C:
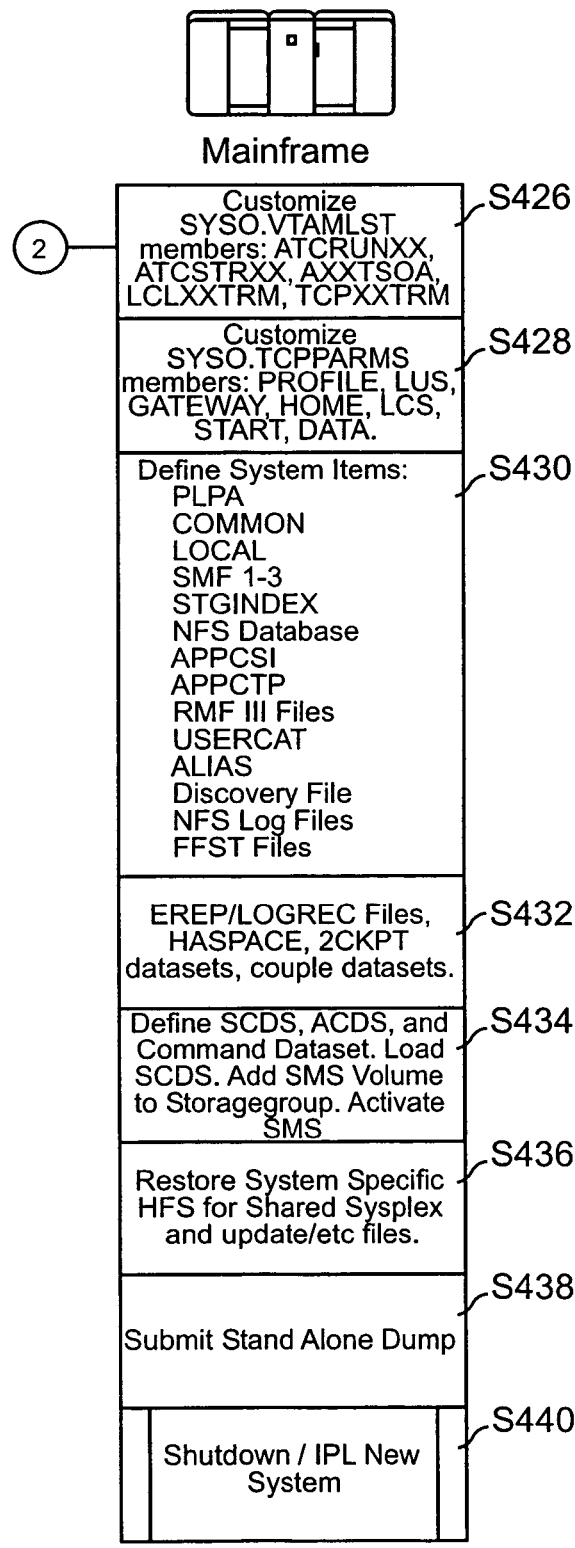
FIG. 5C is a flowchart illustrating the final steps associated with customizing an upgraded operating system for a mainframe computer system in accordance with the present invention.

FIGS. 5A, 5B and 5C identify preferred steps in customizing the newly installed mainframe computer system 2 that has the upgraded operating system installed thereon. For example, adding software products, for example, WEBSPHERE MQ products, to a mainframe computer system 2 is implemented using the preferred steps described below.

In step S366 (FIG. 5A), the mainframe computer system 2 is IPL'D. In step S368, the user of client computer system 4 enters the IP address of the upgraded mainframe computer system 2. In step S370, the mainframe upgrade system 10 preferably receives information from a user directed to installed hardware on the mainframe computer system 2. For example, in step S372, the user identifies a OSA token ring adapter. In step S374, the user identifies an OSA Ethernet adapter. In step S376, the user identifies a CISCO CIP adapter. In step S378, the user identifies QDIO adapter. In the event that an OSA token ring or OSA Ethernet net adapters are identified (in step S372 and S374, respectively), then the user is preferably prompted to enter a link number (step S380). Thereafter, a UCB interface address is similarly provided (step S382). If, in step S376, a CISCO CIP adapter is identified, then additional information including a host CLAW Name (step S384), and a Host Workstation name (step S386) are preferably provided and, thereafter, the UCB interface address is submitted (step S382). Moreover, in the event, in step S378, that a QDIO adapter is identified, then, additional information including a Read Address (step S388), a Data Path address (step S390) and a TRLE name (step S392) are submitted by the user to the mainframe upgrade system 10. Thereafter, a UCB interface address is provided (step S382).

After the UCB interface address is entered (step S382), the user is prompted to enter the console UCB address (step S394). Thereafter, the a 3270 UCB address is provided (step S396) and a TCP/IP Net Mask is entered by the user (step S398).

Continuing with the flowchart in FIG. 5B, after the TCP/IP net mask is provided, then, in step S400 a TCP/IP gateway address is entered. In step S402, the user provides a DNS address, and in step S404, a domain name is entered. Moreover, in step S406, the user provides a VTAM subarea, a Host name is provided in step S408, and, in step S410, the user submits the time zone where the mainframe computer system 2 is located.

In step S412, the system makes a determination whether the State where the customization process is occurring is either Alaska, Hawaii or Indiana. If, during the customization process, in step S414, a determination is made that the State is not Alaska, Hawaii or Indiana, then a determination is made whether the mainframe computer system 2 is running DST. These are states that handle daylight savings time in a different manner. The user is prompted to submit a customer identification number (step S416). Thereafter, in step S418, determination is made whether to continue with the process, re-enter any of the above-identified parameters, or cancel the process. In the event that some of the parameters (e.g., the TCPIP gateway, the TCPIP net mask, UCB address, and the like) require modification or re-entry, then the process loops back to step S366 and the mainframe computer system 2 has another IPL performed thereon. In the event that, in step S418, the determination is made to cancel the process, then, in step S420, the process terminates.

Alternatively, in step S418, if the user desires to continue, then SMPE zones are loaded to the SMPE volume (step S422). Moreover, SYS0.PARMLIB members: APPCPMXO, COMMNDXO, CONSOLXO, and IEASYMXO are customized (step S424).

Referring now to the steps illustrated in FIG. 5(c), the process associated with customizing an upgraded mainframe computer system 2 are described.

In step S426, the SYS0.VTAMLST members: ATCRUNXX, ATCSTRXX, AXXTSOA, LCLXXTRM, and TCPXXTRM are customized. In step S428, the SYS0.TCPPARMS members: PROFILE, LUS, GATEWAY, HOME, LCS, START and DATA are customized. Moreover, in step S430, system items are defined. In step S432, a plurality of data sets and files are created including the EREP/OLGREC files, HASPACE, 2 CKPT DATA SETS, and couple data sets are defined. Further, in step S434, SCDS, ACDS and COMMAND DATA SETS are defined. The SCDS is loaded, and the SMS volume is added to the storage group. Moreover, in step S434, SMS is activated.

In step S436, System Specific HFS for shared Sysplex and Update files, and the like are restored. In step S438, a stand alone dump is submitted, and the system is shut down, and, thereafter, the upgraded mainframe computer system 2 has another IPL performed thereon (step S440).

Thus, as defined by the steps identified in FIGS. 4(a) through 5(c), an automated upgrade for mainframe computer system 2 is performed.

In accordance with the invention, the combined processes directed to upgrading a new operating system on a mainframe computer system 2, modifying an existing operating system, or adding new products to an existing mainframe computer system 2 provides significant time and cost savings.

Moreover, the skill level of a person who performs a mainframe computer system 2 operating system upgrade and maintenance is able to be significantly lower than for prior art mainframe operating system upgrades. This is due, in large part, because many of the tasks associated with installation, configuration and modification of mainframe computer system 2 operating systems, is performed automatically. The present invention preferably reads operating system internal control blocks to assess the entire system. The information received from the assessment is used as a template for changes, upgrades, clones and the like. As changes are made to the environment in the mainframe computer system 2, the otherwise disjointed components that contribute to the overall system are automatically combined, thereby maintaining seamless operations for upgrading the mainframe computer system 2.

In accordance with the present invention, a graphic user interface front end is provided for the user operating client computer system 2, and a plurality of utilities operating in a back end are accordingly provided. Moreover, in accordance with the present invention, the knowledge base or inventory of a complete mainframe operating system is preferably maintained. In comparison with prior art software and hardware mainframe installation and upgrade applications, the present invention provides significant benefits, including financial, time and personnel savings.

Although the present invention has been described in relation to particular embodiments thereof, many other variations and modifications and other uses will become apparent to those skilled in the art. Therefore, the present invention is not be limited by the specific disclosure herein.

What is claimed is:

1. A method to remotely install an operating system upgrade and at least one optional product on a mainframe computer system using a personal computer over a communication network, said method comprising:

performing system discovery to determine existing components installed on said mainframe computer system before said discovery is performed and further to determine how said mainframe computer system is configured, wherein said performing said system discovery occurs substantially automatically;

generating information in response to said system discovery wherein said information represents said existing components and said configuration;

storing said information representing said existing components and said configuration in a database;

transferring a plurality of mainframe operating system components comprising said operating system upgrade to said mainframe;

establishing a communication session over said communication network between said personal computer and said mainframe computer, and receiving from said personal computer instructions to control installation of said operating system upgrade;

combining said plurality of mainframe operating system components with said existing components and customizing said combination of components in response to receiving said instructions to enable said mainframe to perform a first initial program load, wherein said combining and said customizing are performed automatically using said information;

performing said first initial program load on said mainframe computer system;

receiving from said personal computer a selection of said at least one optional product to be included in said upgrade;

installing said at least one optional product identified in said selection in said mainframe computer system; and performing a second initial program load to implement said at least one optional product.

2. The method of claim 1, wherein said existing components include at least one of a partition, volume, partitioned data set, and identifier of a user in a RACF directory.

3. The method of claim 1, wherein said communication network is the Internet.

4. The method of claim 1, wherein said mainframe computer system and said personal computer system communicate over a TCP/IP connection.

5. A system for a remote installation of at least one of an operating system upgrade and an optional product on a mainframe computer system, said system comprising:

a personal computer, said personal computer programmed and configured to interface with said mainframe computer system over a communication network;

a system discovery module, said system discovery module configured to:

perform system discovery to determine existing components installed on said mainframe computer system and how said mainframe computer system is configured, wherein said system discovery occurs substantially automatically;

generate information in response to said system discovery, wherein said information represents said existing components and said configuration; and store said information representing said existing components and said configuration in a database;

an operating system transfer module, said operating system transfer module configured to transfer a plurality of mainframe operating system components comprising said operating system upgrade to said mainframe after said system discovery is performed; and an upgrade installation module, said upgrade installation module configured to:

combine said plurality of mainframe operating system components with said existing components and customize said combination of components in response to receiving instructions from said personal computer, wherein said combining and said customizing are performed automatically using said information;

perform an initial program load using said combination of components on said mainframe computer system;

receive a selection of said optional product from said personal computer to be included in said upgrade after said initial program load; and install said optional product identified in said selection.

6. The system of claim 5, wherein said existing components include at least one of a partition, volume, partitioned data set, and identifier of a user in a RACF directory.

7. The system of claim 5, wherein said communication network is the Internet.

8. The system of claim 5, wherein said mainframe computer system and said personal computer system communicate over a TCP/IP connection.

9. The method of claim 1, wherein said discovery includes gathering information associated with one or more of a RACF database, IPL, PARMLIB parameters, UCB/EDT tables, SYSRES volume information, TCP/IP profile, VTAM members, catalogs, page data sets, SMS and ACS information, APF, SMP global zones, LPA list information, and SMP-E zone locations.

10. The method of claim 1, wherein said system files are compressed prior to being transmitted to said personal computer.

* * * * *